(12) United States Patent
Simoni et al.

(10) Patent No.: US 10,598,690 B2
(45) Date of Patent: Mar. 24, 2020

(54) MICROELECTROMECHANICAL DEVICE INCORPORATING A GYROSCOPE AND AN ACCELEROMETER

(71) Applicant: STMICROELECTRONICS S.R.L., Agrate Brianza (IT)

(72) Inventors: Barbara Simoni, Bareggio (IT); Carlo Valzasina, Gessate (IT)

(73) Assignee: STMicroelectronics S.r.l., Agrate Brianza (IT)

(*) Notice: Subject to any disclaimer, the term of this patent is extended or adjusted under 35 U.S.C. 154(b) by 385 days.

(21) Appl. No.: 14/964,469

(22) Filed: Dec. 9, 2015

(65) Prior Publication Data

US 2016/0091528 A1    Mar. 31, 2016

Related U.S. Application Data

(63) Continuation of application No. 13/612,585, filed on Sep. 12, 2012, now Pat. No. 9,234,913.

(30) Foreign Application Priority Data

Sep. 12, 2011   (IT) .............................. TO2011A0806

(51) Int. Cl.
*G01P 15/18*     (2013.01)
*G01C 19/574*    (2012.01)
*G01P 15/125*    (2006.01)

(52) U.S. Cl.
CPC ............ *G01P 15/18* (2013.01); *G01C 19/574* (2013.01); *G01P 15/125* (2013.01)

(58) Field of Classification Search
CPC .. G01C 19/574; G01C 19/5747; G01C 23/00; G01P 9/02; G01P 9/04; G01P 15/14;
(Continued)

(56) References Cited

U.S. PATENT DOCUMENTS 4,159,125 A    6/1979   Buchwald
4,744,248 A    5/1988   Stewart
(Continued)

FOREIGN PATENT DOCUMENTS

DE    10 2007 012 163 A1    10/2007
DE    102006046772 A1       4/2008
(Continued)

OTHER PUBLICATIONS

Mamishev et al, Interdigital Sensors and Transducers, Proceedings of the IEEE, vol. 92, No. 5, May 2004 (Year: 2004).*
(Continued)

*Primary Examiner* — Peter J Macchiarolo
*Assistant Examiner* — David L Singer
(74) *Attorney, Agent, or Firm* — Seed IP Law Group LLP

(57) ABSTRACT

A microelectromechanical device includes: a supporting structure; two sensing masses, movable with respect to the supporting structure according to a first axis and a respective second axis; a driving device for maintaining the sensing masses in oscillation along the first axis in phase opposition; sensing units for supplying sensing signals indicative of displacements respectively of the sensing masses according to the respective second axis; processing components for combining the sensing signals so as to: in a first sensing mode, amplify effects on the sensing signals of concordant displacements and attenuate effects of discordant displacements of the sensing masses; and in a second sensing mode, amplify effects on the sensing signals of discordant displacements and attenuate effects of concordant displacements of the sensing masses.

20 Claims, 7 Drawing Sheets

(58) Field of Classification Search
CPC ............ G01P 15/18; B81B 2201/0228; B81B 2201/0235; B81B 2201/0242
USPC .................... 73/504.04, 511, 504.03, 504.12
See application file for complete search history.

(56) References Cited

U.S. PATENT DOCUMENTS

| | | | |
|---|---|---|---|
| 4,750,364 A | | 6/1988 | Kawamura et al. |
| 5,392,650 A | | 2/1995 | O'Brien et al. |
| 5,447,068 A | | 9/1995 | Tang |
| 5,728,936 A | | 3/1998 | Lutz |
| 5,895,850 A | | 4/1999 | Buestgens |
| 5,955,668 A | | 9/1999 | Hsu et al. |
| 6,158,280 A | * | 12/2000 | Nonomura ......... G01C 19/5719 73/504.04 |
| 6,230,563 B1 | | 5/2001 | Clark et al. |
| 6,250,156 B1 | | 6/2001 | Seshia et al. |
| 6,308,567 B1 | | 10/2001 | Higuchi et al. |
| 6,349,597 B1 | | 2/2002 | Folkmer et al. |
| 6,513,380 B2 | | 2/2003 | Reeds, III et al. |
| 6,520,017 B1 | | 2/2003 | Schoefthaler et al. |
| 6,535,800 B2 | | 3/2003 | Wallner |
| 6,722,197 B2 | | 4/2004 | Knowles et al. |
| 6,725,719 B2 | | 4/2004 | Cardarelli |
| 6,752,017 B2 | | 6/2004 | Willig et al. |
| 6,766,689 B2 | | 7/2004 | Spinola Durante et al. |
| 6,837,107 B2 | | 1/2005 | Geen |
| 6,845,665 B2 | | 1/2005 | Geen |
| 6,848,304 B2 | | 2/2005 | Geen |
| 6,928,872 B2 | | 8/2005 | Durante et al. |
| 7,155,976 B2 | | 1/2007 | Kai-Cheng et al. |
| 7,210,351 B2 | | 5/2007 | Lo et al. |
| 7,240,552 B2 | | 7/2007 | Acar et al. |
| 7,284,429 B2 | | 10/2007 | Chaumet et al. |
| 7,322,242 B2 | | 1/2008 | Merassi et al. |
| 7,347,094 B2 | | 3/2008 | Geen et al. |
| 7,398,683 B2 | | 7/2008 | Lehtonen |
| 7,454,246 B2 | | 11/2008 | Merfeld |
| 7,461,552 B2 | | 12/2008 | Acar |
| 7,481,111 B2 | | 1/2009 | Caminada et al. |
| 7,513,155 B2 | | 4/2009 | Jeong et al. |
| 7,694,563 B2 | | 4/2010 | Durante et al. |
| 7,765,869 B2 | | 8/2010 | Sung et al. |
| 7,797,998 B2 | | 9/2010 | Menard et al. |
| 7,907,177 B2 | | 3/2011 | Haino et al. |
| 7,950,281 B2 | | 5/2011 | Hammerschmidt |
| 8,020,441 B2 | | 9/2011 | Seeger |
| 8,037,756 B2 | | 10/2011 | Caminada et al. |
| 8,037,757 B2 | | 10/2011 | Johnson |
| 8,042,394 B2 | | 10/2011 | Coronato et al. |
| 8,042,396 B2 | | 10/2011 | Coronato et al. |
| 8,113,050 B2 | | 2/2012 | Acar et al. |
| 8,117,912 B2 | | 2/2012 | Kawakubo et al. |
| 8,250,921 B2 | | 8/2012 | Nasiri et al. |
| 8,256,290 B2 | | 9/2012 | Mao |
| 8,261,614 B2 | | 9/2012 | Hartmann et al. |
| 8,272,267 B2 | | 9/2012 | Tamura et al. |
| 8,312,769 B2 | | 11/2012 | Coronato et al. |
| 8,342,023 B2 | | 1/2013 | Geiger |
| 8,342,025 B2 | | 1/2013 | Coronato et al. |
| 8,347,716 B2 | | 1/2013 | Cazzaniga et al. |
| 8,347,717 B2 | | 1/2013 | Seeger et al. |
| 8,353,212 B2 | | 1/2013 | Hammer |
| 8,375,789 B2 | | 2/2013 | Prandi et al. |
| 8,413,506 B2 | | 4/2013 | Coronato et al. |
| 8,429,970 B2 | | 4/2013 | Rocchi |
| 8,459,109 B2 | | 6/2013 | Caminada et al. |
| 8,459,110 B2 | | 6/2013 | Cazzaniga et al. |
| 8,464,585 B2 | | 6/2013 | Raman et al. |
| 8,534,127 B2 | | 9/2013 | Seeger et al. |
| 8,549,917 B2 | | 10/2013 | Cazzaniga et al. |
| 8,549,919 B2 | | 10/2013 | Guenthner et al. |
| 8,616,057 B1 | | 12/2013 | Mao |
| 8,667,842 B2 | | 3/2014 | Prandi |
| 8,950,257 B2 | | 2/2015 | Cazzaniga et al. |
| 8,960,002 B2 | | 2/2015 | Nasiri et al. |
| 9,003,882 B1 | | 4/2015 | Ayazi et al. |
| 9,010,184 B2 | | 4/2015 | Zou et al. |
| 9,038,461 B2 | | 5/2015 | Kanemoto |
| 9,194,704 B2 | | 11/2015 | Lin et al. |
| 2002/0078746 A1 | | 6/2002 | Mochida |
| 2002/0134154 A1 | | 9/2002 | Hsu et al. |
| 2002/0183899 A1 | | 12/2002 | Wallner |
| 2002/0189351 A1 | | 12/2002 | Reeds et al. |
| 2002/0189352 A1 | | 12/2002 | Reeds et al. |
| 2002/0189353 A1 | | 12/2002 | Knowles et al. |
| 2003/0131664 A1 | | 7/2003 | Mochida et al. |
| 2003/0164040 A1 | | 9/2003 | Willig et al. |
| 2004/0172167 A1 | * | 9/2004 | Pasolini .................. G01P 13/00 700/245 |
| 2004/0211257 A1 | | 10/2004 | Geen |
| 2004/0211258 A1 | * | 10/2004 | Geen .................. G01C 19/5719 73/510 |
| 2005/0050954 A1 | * | 3/2005 | Chaumet ............ G01C 19/5747 73/504.12 |
| 2005/0229703 A1 | | 10/2005 | Geen et al. |
| 2005/0274185 A1 | * | 12/2005 | Lo ......................... G01P 15/125 73/514.01 |
| 2006/0032310 A1 | | 2/2006 | Merassi et al. |
| 2006/0112764 A1 | | 6/2006 | Higuchi |
| 2006/0272411 A1 | | 12/2006 | Acar et al. |
| 2007/0062282 A1 | | 3/2007 | Akashi et al. |
| 2007/0131030 A1 | * | 6/2007 | Jeong ................. G01C 19/5747 73/504.12 |
| 2007/0198187 A1 | * | 8/2007 | Pasolini .............. G01C 22/006 73/489 |
| 2007/0214883 A1 | * | 9/2007 | Durante ............. G01C 19/5712 73/504.04 |
| 2007/0289382 A1 | | 12/2007 | Caminada et al. |
| 2008/0115562 A1 | | 5/2008 | Haino et al. |
| 2008/0190200 A1 | | 8/2008 | Caminada et al. |
| 2008/0276706 A1 | | 11/2008 | Hartmann et al. |
| 2009/0056443 A1 | * | 3/2009 | Netzer ............... G01C 19/5719 73/504.12 |
| 2009/0064780 A1 | | 3/2009 | Coronato et al. |
| 2009/0100930 A1 | | 4/2009 | Coronato et al. |
| 2010/0078740 A1 | * | 4/2010 | Cazzaniga ............ B81B 3/0013 257/415 |
| 2010/0116050 A1 | | 5/2010 | Wolfram |
| 2010/0126269 A1 | | 5/2010 | Coronato et al. |
| 2010/0126272 A1 | * | 5/2010 | Coronato ........... G01C 19/5712 73/504.14 |
| 2010/0132463 A1 | | 6/2010 | Caminada et al. |
| 2010/0149721 A1 | | 6/2010 | Prandi |
| 2010/0154541 A1 | | 6/2010 | Cazzaniga et al. |
| 2010/0186507 A1 | | 7/2010 | Günthner et al. |
| 2010/0192690 A1 | | 8/2010 | Classen et al. |
| 2010/0223996 A1 | | 9/2010 | Fukumoto |
| 2010/0236327 A1 | | 9/2010 | Mao |
| 2010/0263446 A1 | * | 10/2010 | Tamura .............. G01C 19/5712 73/504.12 |
| 2010/0281977 A1 | | 11/2010 | Coronato et al. |
| 2010/0307243 A1 | * | 12/2010 | Prandi ................ G01C 19/5726 73/504.12 |
| 2011/0023600 A1 | * | 2/2011 | Wrede ................ G01C 19/5712 73/504.13 |
| 2011/0023604 A1 | * | 2/2011 | Cazzaniga ......... G01C 19/5712 73/514.32 |
| 2011/0030473 A1 | | 2/2011 | Acar |
| 2011/0061460 A1 | * | 3/2011 | Seeger ............... G01C 19/5719 73/504.12 |
| 2011/0094302 A1 | | 4/2011 | Schofield et al. |
| 2011/0154898 A1 | * | 6/2011 | Cazzaniga ......... G01C 19/5747 73/504.12 |
| 2011/0303007 A1 | * | 12/2011 | Rocchi ................ G01C 19/574 73/504.09 |
| 2012/0024056 A1 | | 2/2012 | Hammer |
| 2012/0031977 A1 | | 2/2012 | Havens et al. |
| 2012/0048017 A1 | | 3/2012 | Kempe |
| 2012/0060604 A1 | | 3/2012 | Neul et al. |
| 2012/0061172 A1 | * | 3/2012 | Yacine ............... G01C 19/5747 181/121 |
| 2012/0210789 A1 | | 8/2012 | Kanemoto |

(56) References Cited

U.S. PATENT DOCUMENTS

| | | |
|---|---|---|
| 2013/0031977 A1 | 2/2013 | Kempe |
| 2013/0125649 A1 | 5/2013 | Simoni et al. |
| 2013/0167636 A1 | 7/2013 | Coronato et al. |
| 2013/0174661 A1 | 7/2013 | Kuhlmann et al. |
| 2014/0021564 A1 | 1/2014 | Cazzaniga et al. |
| 2014/0116136 A1 | 5/2014 | Coronato et al. |
| 2015/0059473 A1 | 3/2015 | Jia |
| 2015/0114112 A1 | 4/2015 | Valzasina et al. |
| 2016/0091528 A1 | 3/2016 | Simoni et al. |

FOREIGN PATENT DOCUMENTS

| | | |
|---|---|---|
| DE | 10 2007 054 505 A1 | 5/2009 |
| EP | 1619471 A1 | 1/2006 |
| EP | 1 624 286 A1 | 2/2006 |
| EP | 1 832 841 A1 | 9/2007 |
| EP | 2108964 A2 | 10/2009 |
| JP | 2005-241500 A | 9/2005 |
| WO | 2006/043890 A1 | 4/2006 |
| WO | 2007/086849 A1 | 8/2007 |
| WO | 2007/145113 A1 | 12/2007 |
| WO | 2009/033915 A1 | 3/2009 |
| WO | 2009/087858 A1 | 7/2009 |

OTHER PUBLICATIONS

Memidex dictionary/thesaurus, definition: proximate (Year: 2019).*
Schofield, A.R. et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

* cited by examiner

MICROELECTROMECHANICAL DEVICE INCORPORATING A GYROSCOPE AND AN ACCELEROMETER

BACKGROUND

Technical Field

The present disclosure relates to a microelectromechanical device integrating a gyroscope and an accelerometer.

Description of the Related Art

As is known, the use of microelectromechanical systems (MEMS) has continued to spread to various sectors of technology and has yielded encouraging results especially in the production of inertial sensors, microintegrated gyroscopes, and electromechanical oscillators for a wide range of applications.

MEMS of this sort are usually based upon microelectromechanical structures comprising at least one mass connected to a supporting body (stator) through springs and movable with respect to the stator according to pre-set degrees of freedom. The movable mass and the stator are capacitively coupled through a plurality of respective comb-fingered and mutually facing electrodes, so as to form capacitors. The movement of the movable mass with respect to the stator, for example on account of an external stress, modifies the capacitance of the capacitors, whence it is possible to trace back to the relative displacement of the movable mass with respect to the fixed body and hence to the force applied. Conversely, by supplying appropriate biasing voltages, it is possible to apply an electrostatic force to the movable mass to set it in motion. Moreover, to obtain electromechanical oscillators, the frequency response of the inertial MEMS structures is exploited, which is typically of a second-order low-pass type, with a resonance frequency.

In particular, MEMS accelerometers exploit the fact that the displacements of the movable mass along the sensing axis or axes are correlated to the amplitude of the components of acceleration along the same axes to which the stator is subjected. These displacements are countered by the elastic action of the springs and can be sensed through the variations of the capacitive coupling, as mentioned above.

MEMS gyroscopes have a more complex electromechanical structure, which typically comprises two masses that are movable with respect to the stator and coupled together so as to have a relative degree of freedom. The two movable masses are both capacitively coupled to the stator. One of the masses is dedicated to driving and is kept in oscillation at the resonance frequency with controlled amplitude. The other mass is driven in oscillatory (translational or rotational) motion and, in the case of rotation of the microstructure with respect to a pre-set gyroscopic axis at an angular velocity, is subject to a Coriolis force proportional to the angular velocity itself. In practice, the driven mass, which is capacitively coupled to the fixed body through electrodes, like the driving mass, operates as an accelerometer that enables sensing of the Coriolis force and acceleration and hence makes it possible to trace back to the angular velocity. In some cases, a single mass is constrained to the stator so as to be movable with respect to the stator itself with two independent degrees of freedom. A driving device maintains the movable mass in controlled oscillation according to one of the degrees of freedom. The movable mass can then move according to the other degree of freedom in response to a rotation of the stator about a sensing axis, as a result of the Coriolis force.

In several applications, correct sensing of the translational and rotational movement of a device or of a part of a system is assuming increasing importance, and increasingly sophisticated solutions are required. For this reason, manufacturers have been pushed to equip the devices in question with sensors of various types, accelerometers and gyroscopes, so as to supply simultaneously measurements of acceleration and of angular velocity.

Currently, distinct devices are provided, possibly packaged in one and the same package. The solution presents, however, limitations, both in terms of overall dimensions, and in terms of levels of consumption, i.e., as regards aspects that are perceived as critical in modern microelectronics.

BRIEF SUMMARY

The present disclosure is directed to a microelectromechanical device that enables the limitations described above to be overcome and, in particular, is compact and versatile.

One embodiment of the present disclosure is directed to a microelectromechanical device having a supporting structure, a first sensing mass and a second sensing mass, movable with respect to the supporting structure according to a first axis and according to a second axis, perpendicular to the first axis a driving device configured to maintain the first sensing mass and the second sensing mass in oscillation along the first axis in phase opposition, and a first group of sensors and a second group of sensors configured to supply sensing signals indicative of displacements of the first sensing mass and of second sensing mass, respectively according to the second axis. The processing components are configured to combine the sensing signals in a first sensing mode and in a second sensing mode, amplify in the first sensing mode, effects on the sensing signals of concordant displacements and to attenuate effects of discordant displacements of the first sensing mass and of the second sensing mass, and amplify in the second sensing mode, effects on the sensing signals of discordant displacements and to attenuate effects of concordant displacements of the first sensing mass and of the second sensing mass.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
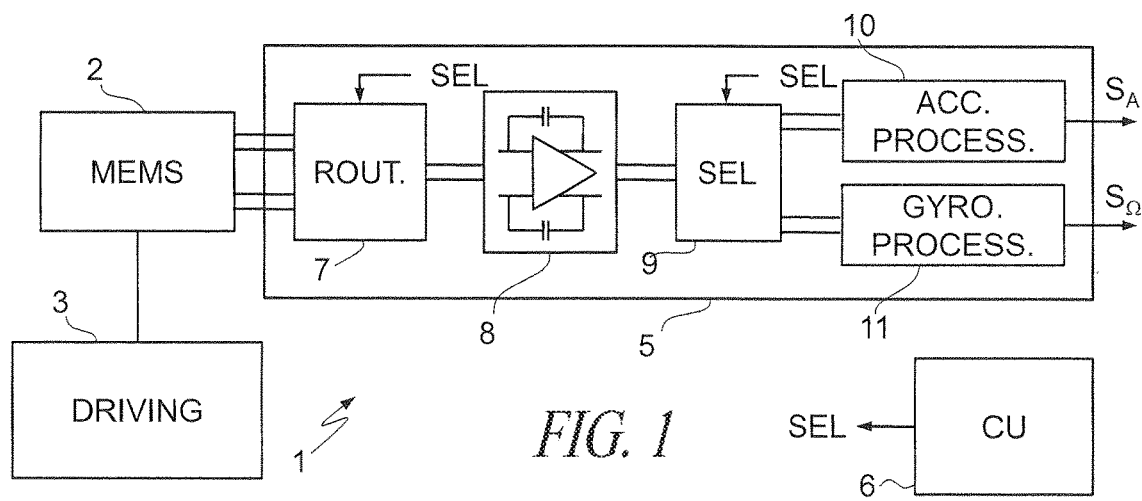
FIG. 1 is a simplified block diagram of a microelectromechanical device according to one embodiment of the present disclosure.

With reference to FIG. 1, a microelectromechanical device 1 integrating the functions of accelerometer and gyroscope comprises a microstructure 2, a driving device 3, a read device 5, and a control unit 6.

As will be explained hereinafter, the microstructure 2 comprises moving elements, which are kept in controlled vibrational motion by the driving device 3 and enable sensing of accelerations and rotations of the microstructure 2 according to a first sensing axis and to a second sensing axis, respectively.

Here and in what follows, the expression "according to an axis" will be used to indicate movements along an axis or about an axis, according to whether the movements allowed for the masses by the respective degrees of freedom are translational or else rotational, respectively.

Likewise, the expression "according to a degree of freedom" will be used to indicate translational or rotational movements, as allowed by the degree of freedom itself.

The microstructure 2 further supplies to the read device 5 sensing signals that are processed to obtain acceleration signals $S_A$ and rotation signals $S_\Omega$. The sensing signals, which in one embodiment are differential charge packets, indicate respectively accelerations of the microstructure 2 along the first sensing axis and rotations of the microstructure 2 about the second sensing axis.

The read device 5 is configured to obtain the acceleration signals $S_A$ and the rotation signals $S_\Omega$ from the sensing signals supplied by the microstructure 2, using respectively a first processing mode and a second processing mode, and is controlled for this purpose by the control unit 6.

The read device comprises a routing stage 7, a sensing interface 8, which in the embodiment described is a fully differential switched-capacitor charge amplifier, a selector 9, an acceleration-processing chain 10, and a rotation-processing chain 11.

The routing stage 7 couples the microstructure 2 to input terminals of the sensing interface 8 and establishes respective distinct modalities of coupling in the first processing mode and in the second processing mode. The modalities of coupling can be selected by the control unit 6, for example through a selection signal SEL.

The sensing interface 8 combines the sensing signals received from the microstructure 2 into transduction signals, which, through the selector 9, are supplied to the acceleration-processing chain 10, in the first processing mode, and to the rotation-processing chain 11, in the second processing mode. Also the selector 9 can be controlled through the selection signal SEL.

The acceleration-processing chain 10 and the rotation-processing chain 11 are configured to extract, respectively, the acceleration signals $S_A$ and the rotation signals $S_\Omega$ from the signals received from the sensing interface 8 in a way in itself known.

The control unit 6 selects cyclically the first processing mode and the second processing mode so that updated values of the acceleration signals $S_A$ and of the rotation signals $S_\Omega$ will be constantly available. Alternatively, the control unit 6 can receive an external command that determines the processing mode according to the need.

Figure 2:
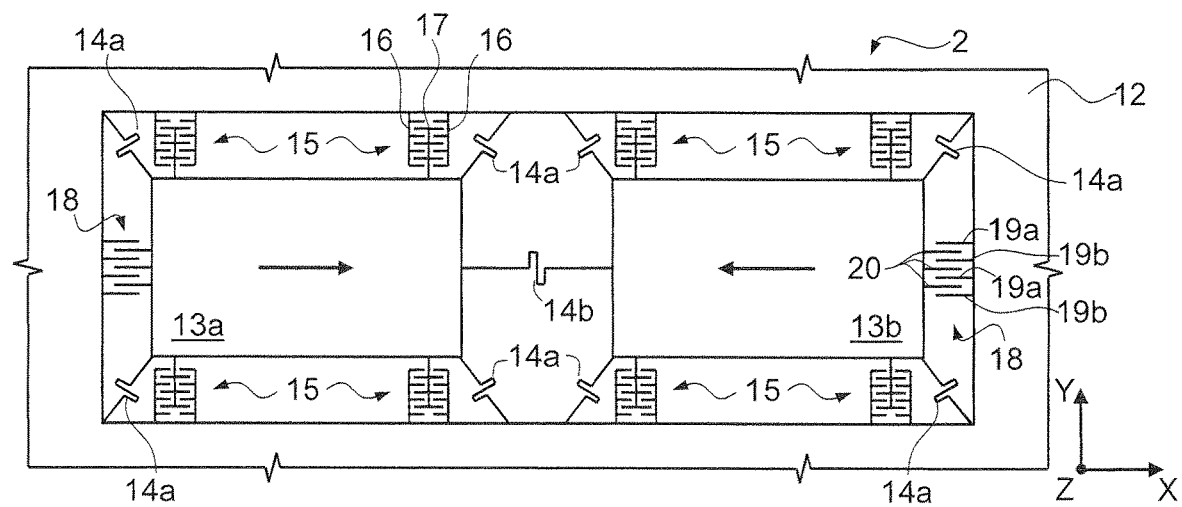
FIG. 2 is a simplified top plan view of a component of the device of FIG. 1.

In one embodiment, the microstructure 2 is made as shown in FIG. 2 and comprises a supporting structure 12, a first sensing mass 13a, and a second sensing mass 13b.

The first sensing mass 13a and the second sensing mass 13b are the same as one another and are movable with respect to the supporting structure 12. More precisely, the sensing masses 13a, 13b are constrained to the supporting structure 12 through respective systems of elastic suspension elements 14a, which enable movements along a first axis X and a second axis Y, which are perpendicular to one another and are both parallel to the surface of the supporting structure 12. The movements of the sensing masses 13a, 13b along a third axis Z perpendicular to the axes X, Y and to the surface of the supporting structure 12 are, instead, prevented.

Optionally, the sensing masses 13a, 13b can be mutually coupled through a further elastic element 14b to improve driving.

Moreover integrated in the microstructure 2 is a portion of the driving device 3. In particular, driving units 15 are coupled in a symmetrical way to the sensing masses 13a, 13b. The driving units 15 comprise fixed driving electrodes 16 and movable driving electrodes 17, which are capacitively coupled to one another, for example in comb-fingered configuration. The fixed driving electrodes 16 are provided on the supporting structure 12, whereas the movable driving electrodes 17 are carried by the respective sensing masses 13a, 13b. The driving units 15 are moreover configured in such a way as to cause displacements of the sensing masses 13a, 13b along a driving axis, for example the axis X, when an electrostatic force is applied between the fixed driving electrodes 16 and the movable driving electrodes 17.

The microstructure 2 further comprises at least one sensing unit 18 for each of the sensing masses 13a, 13b. The sensing masses 13a, 13b are capacitively coupled to the supporting structure 12 through the sensing units 18. More precisely, each sensing unit 18 comprises first and second fixed sensing electrodes 19a, 19b, anchored to the supporting structure 12, and movable sensing electrodes 20, anchored to the respective sensing mass 13a, 13b and interposed between respective first fixed sensing electrodes 19a and second fixed sensing electrodes 19b. The capacitive coupling is of a differential type and is obtained through parallel-plate electrodes, perpendicular to the sensing direction (axis Y) and configured to sense displacements of the sensing masses 13a, 13b according to a sensing axis perpendicular to the driving axis (in this case, the sensing axis is parallel to the axis Y). In addition, the first and second fixed sensing electrodes 19a, 19b of the sensing units 18 of the first sensing mass 13a are electrically connected, respectively, to a first sensing terminal 21a and to a second sensing terminal 22a of the microstructure 2. Likewise, the first and second fixed sensing electrodes 19a, 19b of the sensing units 18 of the second sensing mass 13b are electrically connected, respectively, to a first sensing terminal 21b and to a second sensing terminal 22b of the microstructure 2.

Figure 4:
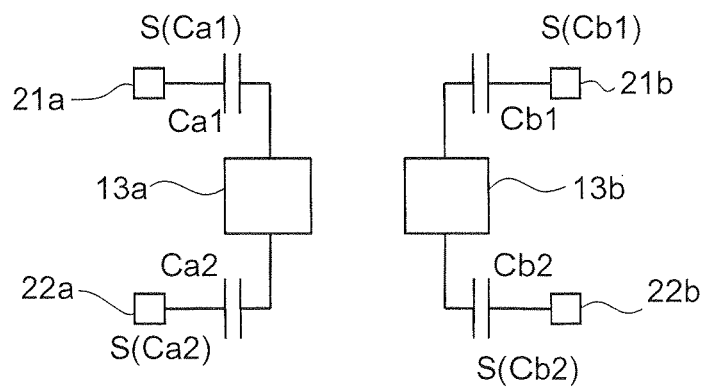
FIG. 4 is a simplified electrical wiring diagram of a detail of the device of FIG. 1.

As is shown in a simplified way in FIG. 4, in practice, the first sensing mass 13a is coupled to the sensing terminals 21a, 22a through differential capacitances Ca1, Ca2, and the second sensing mass 13b is coupled to the sensing terminals 21b, 22b through capacitances Cb1, Cb2, which are also differential. Moreover, in what follows, the capacitances that show concordant variations when the sensing masses 13a, 13b move in the same direction along the sensing axis of the accelerations, which in this case is the axis Y, will be referred to as "corresponding capacitances". In the embodiment described, the capacitances Ca1, Cb1 and the capacitances Ca2, Cb2 are corresponding capacitances.

With reference again to FIGS. 1 and 2, the driving device 3 is configured to set the first sensing mass 13a and the second sensing mass 13b in oscillation at a driving frequency, with controlled amplitude and in phase opposition. At each instant, then, the first sensing mass 13a and the second sensing mass 13b move along the driving axis (axis X) at the same velocity in absolute value, but in opposite directions (the velocities of the sensing masses 13a, 13b at a given instant are schematically represented by arrows in FIG. 2).

Figures 5A, 5B:
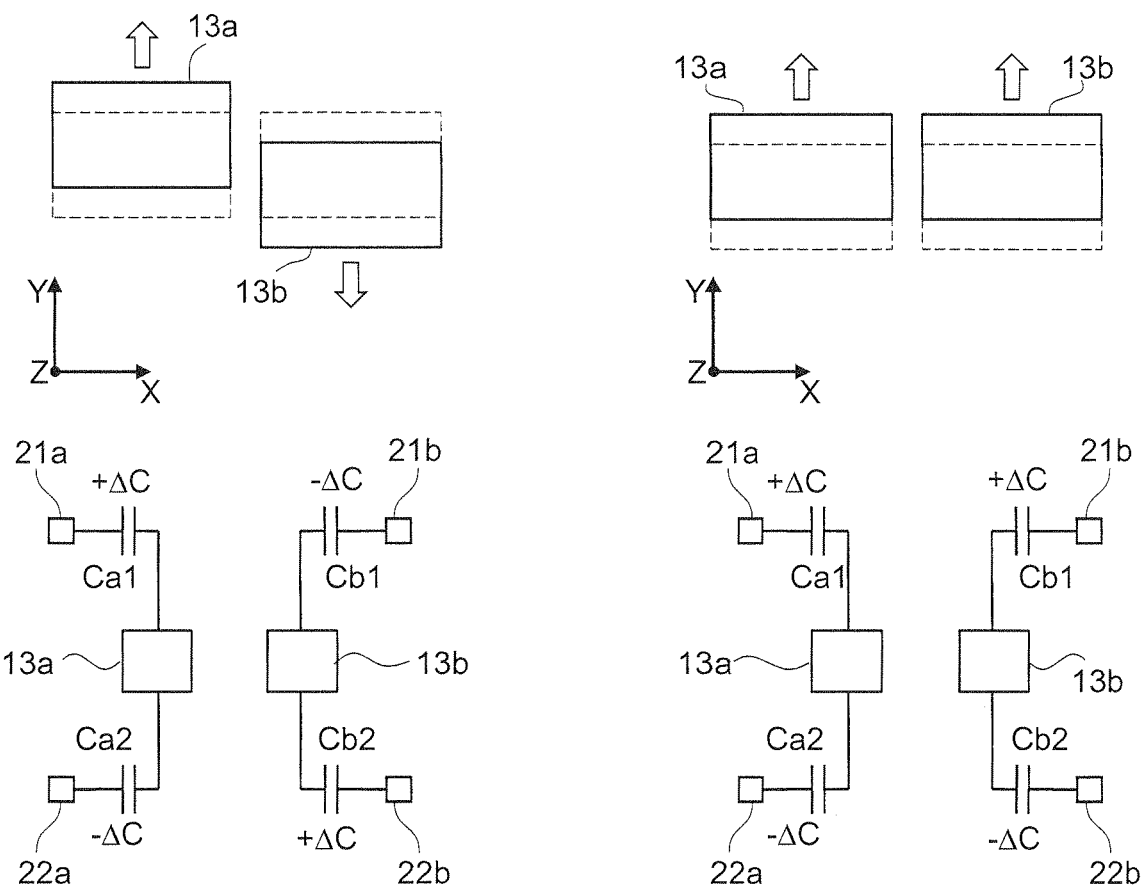
FIG. 5a shows electrical quantities regarding the detail of FIG. 4 and a schematic plan view of the same detail in a first operating configuration.
FIG. 5b shows electrical quantities regarding the detail of FIG. 4 and a schematic plan view of the same detail in a second operating configuration.

As a result of driving in phase opposition, when the microstructure 2 turns about the axis Z, the first sensing mass 13a and the second sensing mass 13b are subjected to Coriolis forces parallel to the sensing axis (axis Y), which have the same absolute value and opposite sign, as shown schematically in FIG. 5a (in FIGS. 5a and 5b the resting positions of the sensing masses 13a, 13b with respect to the sensing axis are represented with a dashed line). The capacitive coupling of the first sensing mass 13a and of the second sensing mass 13b with the supporting structure 12 hence varies in a differential way. In other words, when the capacitance Ca1 between the first sensing mass 13a and the first sensing terminal 21a of the respective sensing unit 18 has a variation ΔC, the corresponding capacitance Cb1 between the second sensing mass 13b and the first sensing terminal 21b of the respective sensing unit 18 has an opposite variation −ΔC (in linear approximation). A similar reasoning applies to the corresponding capacitances Ca2 and Cb2.

FIG. 5b shows a situation in which the microstructure 2 is subjected to an acceleration along the sensing axis (axis Y). In this case, the first sensing mass 13a and the second sensing mass 13b show concordant displacements, and hence the corresponding capacitances (Ca1 and Cb1 with respect to the first sensing terminals 21a, 21b and Ca2 and Cb2 with respect to the sensing terminals 22a, 22b) likewise present concordant variations (+ΔC for the capacitances Ca1, Cb1 and −ΔC for the capacitances Ca2, Cb2).

Here and in what follows, the displacements of the sensing masses 13a, 13b along the sensing axis of the accelerations (axis Y) in the same direction (as in FIG. 5b) will be referred to as "concordant", whereas the displacements of the sensing masses 13a, 13b along the sensing axis of the accelerations in opposite directions (as in FIG. 5a) will be referred to as "discordant".

The sensing signals may be captured and combined so as to add the signal contributions due to the corresponding capacitances Ca1, Cb1 (Ca1+Cb1) and Ca2, Cb2 (Ca2+Cb2) (and hence to concordant displacements of the sensing masses 13a, 13b), in a first reading mode, or acceleration-reading mode. In a second reading mode, or rotation-reading mode, the sensing signals may be combined so as to subtract the signal contributions due to the corresponding capacitances Ca1, Cb1 (Ca1−Cb1) and Ca2, Cb2 (Ca2−Cb2) (and hence to discordant displacements of the sensing masses 13a, 13b). In this way, it is possible to amplify the signal components due in one case to the acceleration along the axis Y and in the other case to the rotation about the axis Z, attenuating, instead, the signal components due to the quantity that is not measured. To improve reading, moreover, the signal components due to differential capacitances (Ca1, Ca2 for the first sensing mass 13a and Cb1, Cb2 for the second sensing mass 13b) are subtracted.

In the acceleration-reading mode, as has been said, the signal contributions due to the corresponding capacitances Ca1, Cb1 and Ca2, Cb2 are added so as to amplify the contributions due to concordant displacements and attenuate the contributions due to discordant displacements. The effect of the acceleration along the axis Y is thus amplified, whereas the effect of the rotation about the axis Z is attenuated.

For simplicity, in FIGS. 5a, 5b the signal contributions due to the capacitances Ca1, Ca2, Cb1, Cb2 are designated, respectively, by S(Ca1), S(Ca2), S(Cb1), S(Cb2). According to what has been set forth above, in the acceleration-reading mode, the signal contributions S(Ca1), S(Ca2), S(Cb1), S(Cb2) are combined in a first sensing signal S' as follows:

$$S'=(S(Ca1)+S(Cb1))-(S(Ca2)+S(Cb2)) \qquad (1)$$

The variations ΔC of the corresponding capacitances Ca1, Cb1 and Ca2, Cb2 are concordant in the case of acceleration of the microstructure 2 along the axis Y and hence are summed, whereas they are discordant and compensate in the case of rotation about the axis Z. In practice, in the acceleration-reading mode, the device 1 is used as linear accelerometer for sensing accelerations along the axis Y, whereas the components due to rotation about the axis Z are suppressed.

In the rotation-reading mode, the signal contributions due to the corresponding capacitances Ca1, Cb1 and Ca2, Cb2 are subtracted so as to amplify the contributions due to discordant displacements of the sensing masses 13a, 13b and attenuate the contributions due to concordant displacements. The effect of the rotation about the axis Z is thus amplified, whereas the effect of the rotation about the axis Z is attenuated. In the rotation-reading mode, in particular, the signal contributions S(Ca1), S(Ca2), S(Cb1), S(Cb2) are combined in a second sensing signal S" as follows:

$$S''=(S(Ca1)-S(Cb1))-(S(Ca2)-S(Cb2)) \qquad (2)$$

Unlike in the acceleration-reading mode, the variations ΔC of the corresponding capacitances Ca1, Cb1 and Ca2, Cb2 are compensated in the case of acceleration of the microstructure 2 along the axis Y, whereas they are discordant and are added as a result of the combination of the signal contributions S(Ca1), S(Ca2), S(Cb1), S(Cb2), in the case of rotation about the axis Z. In the rotation-reading mode, the device 1 is hence used as gyroscope (of the yaw type) for sensing rotation about the axis Z, whereas the components due to accelerations along the axis Y are suppressed.

Figure 6A:
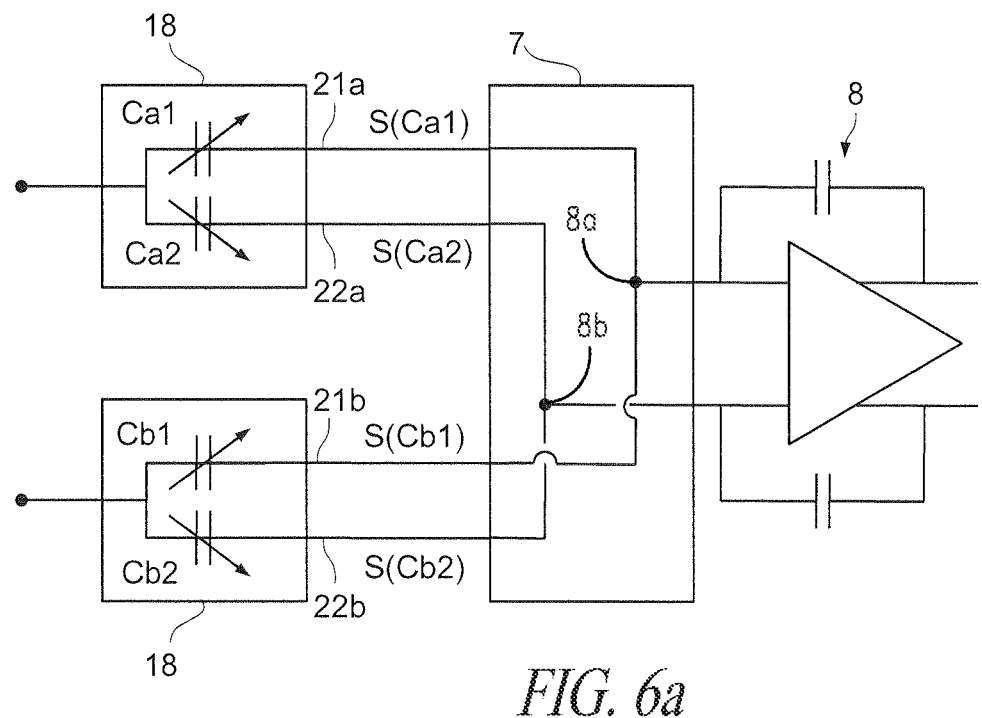
FIG. 6a is an electrical wiring diagram regarding the coupling of the component of FIG. 2 to a sensing interface of the device of FIG. 1, in a first sensing mode.
Figure 6B:
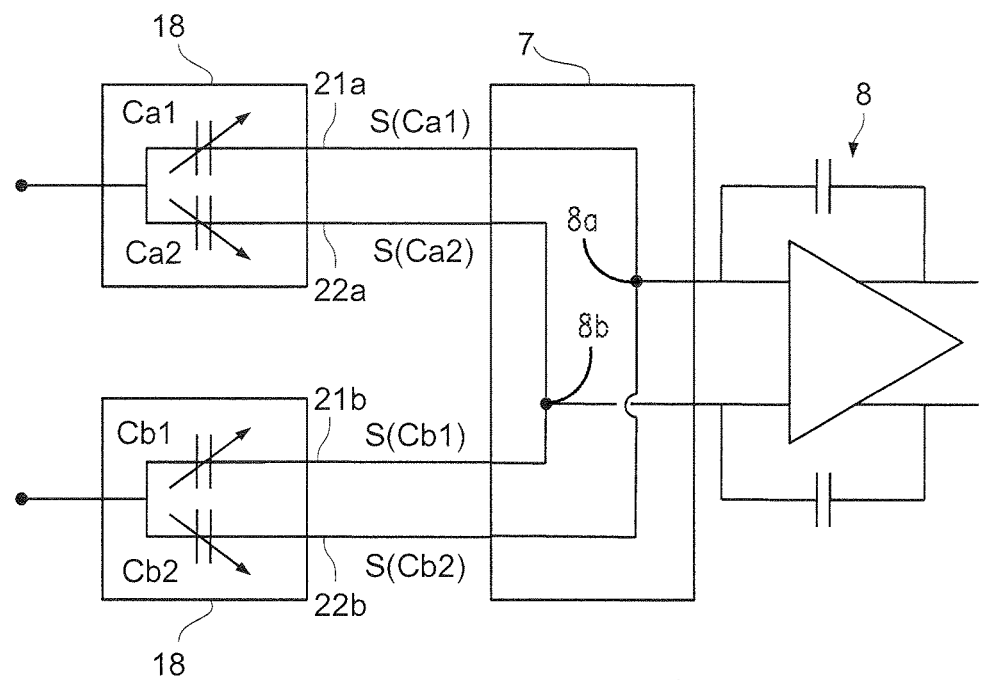
FIG. 6b is an electrical wiring diagram regarding the coupling of the component of FIG. 2 to a sensing interface of the device of FIG. 1, in a second sensing mode.

In the embodiment described, the combination of the signal contributions S(Ca1), S(Ca2), S(Cb1), S(Cb2) in the two reading modes is carried out by the routing stage 7 and by the sensing interface 8 as described hereinafter with reference to FIGS. 6a and 6b.

The routing stage 7 can comprise, for example, switches (not shown) for modifying the couplings between the terminals of the microstructure 2 and the sensing interface 8 and, as already mentioned, is controlled by the control unit 6.

In particular, when the control unit 6 selects the first processing mode, the routing stage 7 connects the microstructure 2 to the read interface 8 in the acceleration-reading mode. In this case (FIG. 6*a*), the first sensing terminal 21*a* (first sensing mass 13*a*) and the first sensing terminal 21*b* (second sensing mass 13*b*) of the microstructure 2 are connected to a first input 8*a* of the sensing interface 8, whereas the second sensing terminal 22*a* (first sensing mass 13*a*) and the second sensing terminal 22*b* (second sensing mass 13*b*) of the microstructure 2 are connected to a second input 8*b* of the sensing interface 8. The signal contributions of capacitances connected in parallel to one and the same input of the sensing interface 8 are added together (S(Ca1)+S(Cb1) and S(Ca2)+S(Cb2)), while the sensing interface computes the difference between signal contributions arriving at distinct inputs.

The routing stage 7 connects the microstructure 2 to the read interface 8 in the rotation-reading mode when the second processing mode is selected by the control unit 6. In this case (FIG. 6*b*), the first sensing terminal 21*a* (first sensing mass 13*a*) and the second sensing terminal 22*b* (second sensing mass 13*b*) of the microstructure 2 are connected to the first input 8*a* of the sensing interface 8, whereas the second sensing terminal 22*a* (first sensing mass 13*a*) and the first sensing terminal 21*b* (second sensing mass 13*b*) of the microstructure 2 are connected to the second input 8*b* of the sensing interface 8.

In practice, with respect to the acceleration-reading mode, the routing stage 7 inverts the coupling of the sensing terminals of one of the sensing masses 13*a*, 13*b* (in this case of the second sensing mass 13*b*) at the inputs of the sensing interface 8.

The microstructure with a pair of movable masses set in oscillation in phase opposition along the driving axis (axis X) and reading of the displacements of the movable masses along the sensing axis (axis Y) combined in two different modes enable integration in one and the same device of the functions of accelerometer and gyroscope. The disclosure hence affords a considerable saving in terms of area occupation and levels of consumption and hence goes in the direction of the pressing demand for integration of an increasing number of sensors with high levels of performance in an increasingly wider range of applications and electronic devices, in particular portable devices.

Figure 7:
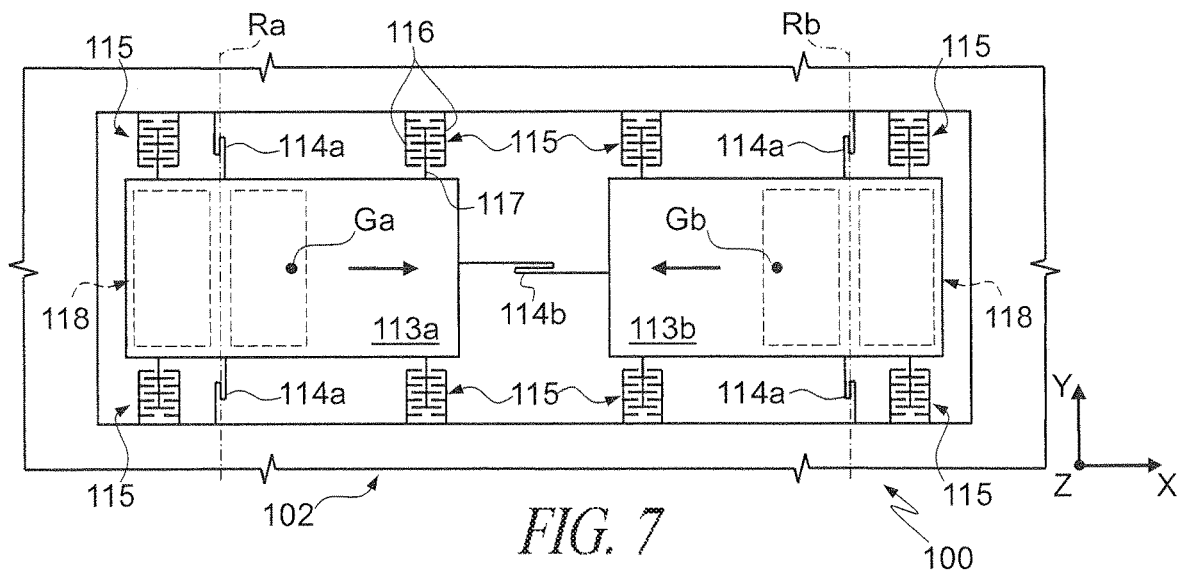
FIG. 7 is a simplified top plan view of a component of a microelectromechanical device according to a second embodiment of the disclosure.
Figure 8A:
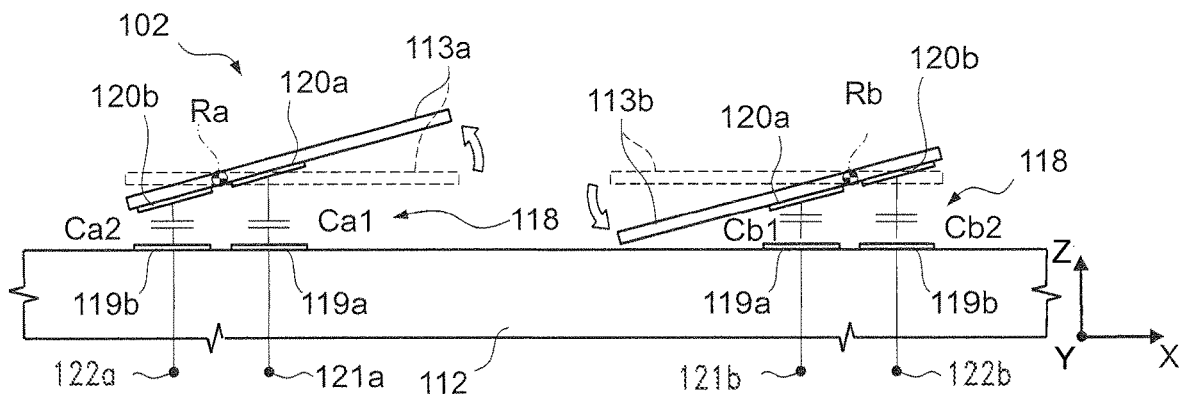
FIG. 8a is a simplified front view of an enlarged detail of the component of FIG. 7 in a first operating configuration.
Figure 8B:
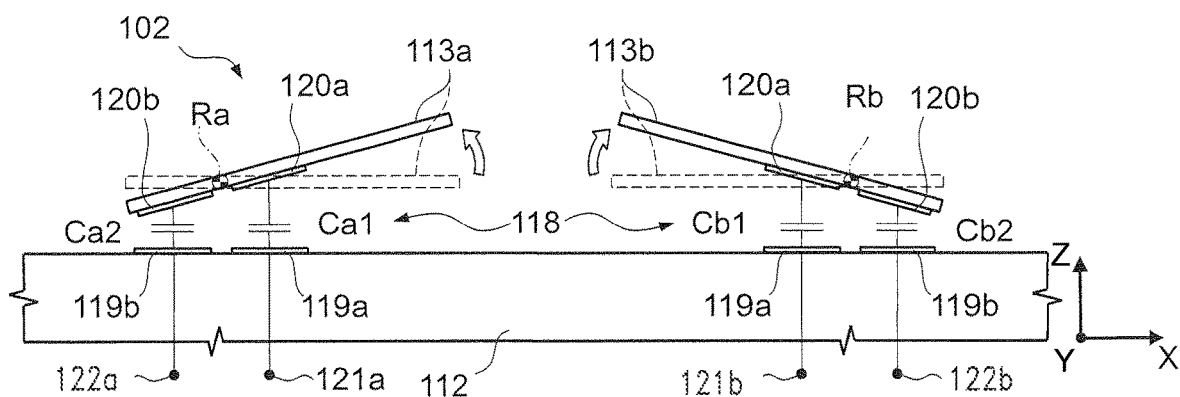
FIG. 8b is a simplified front view of an enlarged detail of the component of FIG. 7 in a second operating configuration.

FIGS. 7, 8*a*, 8*b* illustrate a different embodiment of the disclosure, whereby a device 100 integrating the functions of accelerometer and gyroscope comprises a microstructure 102 and, moreover, the driving device 3, the read device 5, and the control unit 6, substantially as already described previously with reference in particular to FIGS. 1, 6*a*, 6*b*.

The microstructure 102 comprises a supporting structure 112, a first sensing mass 113*a*, and a second sensing mass 113*b*. The first sensing mass 113*a* and the second sensing mass 113*b* are the same as one another and are movable with respect to the supporting structure 112. The sensing masses 113*a*, 113*b* are constrained to the supporting structure 112 through respective systems of elastic suspension elements 114*a*, which enable translational movements along a first axis X and rotational movements about respective rotation axes Ra, Rb parallel to a second axis Y. The axes X, Y are perpendicular to one another and are both parallel to the surface of the supporting structure 12. The rotation axes Ra, Rb are set at the same distance from the centers of gravity Ga, Gb of the respective sensing masses 113*a*, 113*b*. The elastic suspension elements 114*a* are configured so that the center of gravity Ga, Gb fall in the region of the plane XY comprised between the rotation axes Ra, Rb. The elastic suspension elements 114*a* are moreover preloaded so as to maintain the movable masses 113*a*, 113*b* substantially parallel to the supporting structure 112 when the plane XY is horizontal. Optionally, the sensing masses 13*a*, 13*b* can be coupled together through a further elastic element 114*b* to improve driving.

Moreover integrated in the microstructure 102 is a portion of the driving device 3. In particular, driving units 115 are coupled in a symmetrical way to the sensing masses 113*a*, 113*b*. The driving units 115 comprise fixed driving electrodes 116 and movable driving electrodes 117 capacitively coupled together, for example in a comb-fingered configuration. The fixed driving electrodes 116 are provided on the supporting structure 112, whereas the movable driving electrodes 117 are carried by the respective sensing masses 113*a*, 113*b*. The driving units 115 are moreover configured so as to cause displacements of the sensing masses 113*a*, 113*b* along a driving axis, for example the axis X, when an electrostatic force is applied between the fixed driving electrodes 116 and the movable driving electrodes 117.

The microstructure 2 further comprises at least one sensing unit 118 for each of the sensing masses 113*a*, 113*b*. The sensing masses 113*a*, 113*b* are capacitively coupled to the supporting structure 112 through the sensing units 118. More precisely, each sensing unit 118 comprises a first fixed sensing electrode 119*a* and a second fixed sensing electrode 119*b*, and a first movable sensing electrode 120*a* and a second movable sensing electrode 120*b*. The first and second movable sensing electrodes 120*a*, 120*b* are arranged on a face of the respective sensing mass 113*a*, 113*b* towards the supporting structure 112. Moreover, on each of the sensing masses 113*a*, 113*b* the first and second movable sensing electrodes 120*a*, 120*b* are arranged opposite to one another with respect to the respective rotation axes Ra, Rb. Also in this case, the capacitive coupling between the movable and fixed electrodes is of a differential type, and the sensing units 118 are configured to sense rotations of the sensing masses 113*a*, 113*b* about the respective rotation axes Ra, Rb.

In addition, the first and second fixed sensing electrode 119*a*, 119*b* of the sensing unit 118 of the first sensing mass 113*a* are electrically connected, respectively, to a first sensing terminal 121*a* and to a second sensing terminal 122*a* of the microstructure 102. Likewise, the first and second fixed sensing electrodes 119*a*, 119*b* of the sensing unit 118 of the second sensing mass 113*b* are electrically connected, respectively, to a first sensing terminal 121*b* and to a second sensing terminal 122*b* of the microstructure 102. As shown in a simplified way in FIGS. 8*a*, 8*b*, in practice, the first sensing mass 113*a* is coupled to the sensing terminals 121*a*, 122*a* through differential capacitances Ca1, Ca2, and the second sensing mass 113*b* is coupled to the sensing terminals 121*b*, 122*b* through capacitances Cb1, Cb2, which are also differential. Also in this case, the capacitances Ca1, Cb1 and the capacitances Ca2, Cb2 are corresponding capacitances because they show concordant variations when the sensing masses 113*a*, 113*b* move in the same direction along the sensing axis of the accelerations, here the axis Z.

With reference once again to FIG. 7, the driving device 3 is configured to set the first sensing mass 113*a* and the second sensing mass 113*b* in oscillation at a driving frequency, with controlled amplitude and in phase opposition, as already described previously. At each instant, hence, the first sensing mass 113*a* and the second sensing mass 113*b* move along the driving axis (axis X) at the same velocity in absolute value, but in opposite directions.

As a result of driving in phase opposition, when the microstructure 102 turns about the axis Y, the first sensing mass 113a and the second sensing mass 13b are subject to Coriolis forces parallel to the axis Z, having the same absolute value and opposite sign, as shown schematically in FIG. 8a (in FIGS. 8a and 8b the resting positions of the sensing masses 113a, 113b are represented with a dashed line). The sensing masses 113a, 113b hence both turn in a clockwise direction or in a counterclockwise direction about the respective rotation axes Ra, Rb.

In the case of an acceleration along the axis Z, instead, the sensing masses 113a, 113b turn one in a clockwise direction and the other in a counterclockwise direction about the respective rotation axes Ra, Rb, as shown in FIG. 8b.

As regards the embodiment of FIGS. 7, 8a, 8b, the definition "concordant displacements" will be applied to the displacements that cause movements in the same direction along the sensing axis of the accelerations (axis Z) of the portions of the sensing masses 113a, 113b that contain the respective of gravity (i.e., the displacements caused by accelerations along the axis Z). The definition "discordant displacements" will be instead applied to the displacements that cause movements in opposite directions along the sensing axis of the accelerations (axis Z) of the portions of the sensing masses 113a, 113b that contain the respective of gravity (i.e., the displacements caused by rotations about the axis Y as a result of the Coriolis force).

Hence, as in the embodiment described previously, also in this case the variations of the corresponding capacitances Ca1, Cb1 and Ca2, Cb2 are concordant in the case of acceleration along the axis Z and discordant in the case of rotation about the axis Y. The signal contributions at the sensing electrodes 121a, 122a, 121b, 122b can thus be combined as indicated by Eqs. (1) and (2) respectively in the acceleration-reading mode and in the rotation-reading mode. In the acceleration-reading mode, the effects of the concordant displacements of the driving masses 113a, 113b (acceleration along the axis Z) are amplified, whereas the effects of the discordant displacements (rotation about the axis Y) are attenuated. Conversely, in the rotation-reading mode, the effects of the discordant displacements are amplified, whereas the effects of concordant displacements are attenuated. To combine the signal contributions at the sensing electrodes 121a, 122a, 121b, 122b the routing device 7 and the sensing interface 8 are used, as already described.

Figure 9:
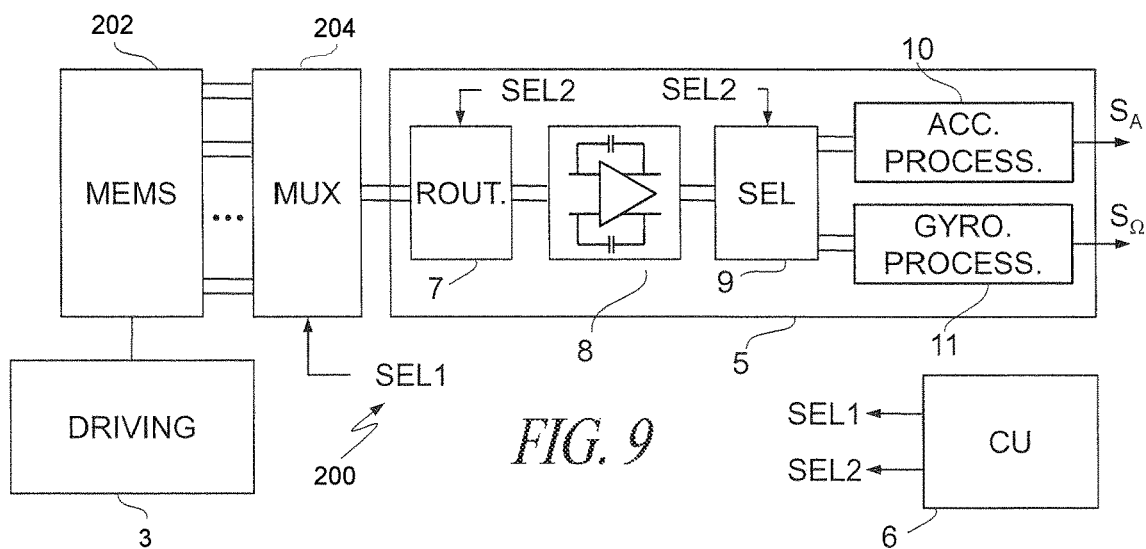
FIG. 9 is a simplified block diagram of a microelectromechanical device according to one embodiment of the present disclosure.

FIG. 9 illustrates a further embodiment of the disclosure. In this case, a microelectromechanical device 200 integrating the functions of multiaxial accelerometer and multiaxial gyroscope comprises a microstructure 202, and, moreover, the driving device 3, a multiplexer 204, the read device 5, and the control unit 6, substantially as already described previously with reference in particular to FIGS. 1, 6a, 6b.

In this case, the microstructure 202 has a plurality of sensing terminals for sensing accelerations and rotations with respect to different sensing axes. The sensing terminals are connected cyclically to the read device 5 through the multiplexer 204, which for this purpose is controlled by the control unit 6 through a selection signal SELL The control unit controls also the read device 5 with a selection signal SEL2.

Figure 10:
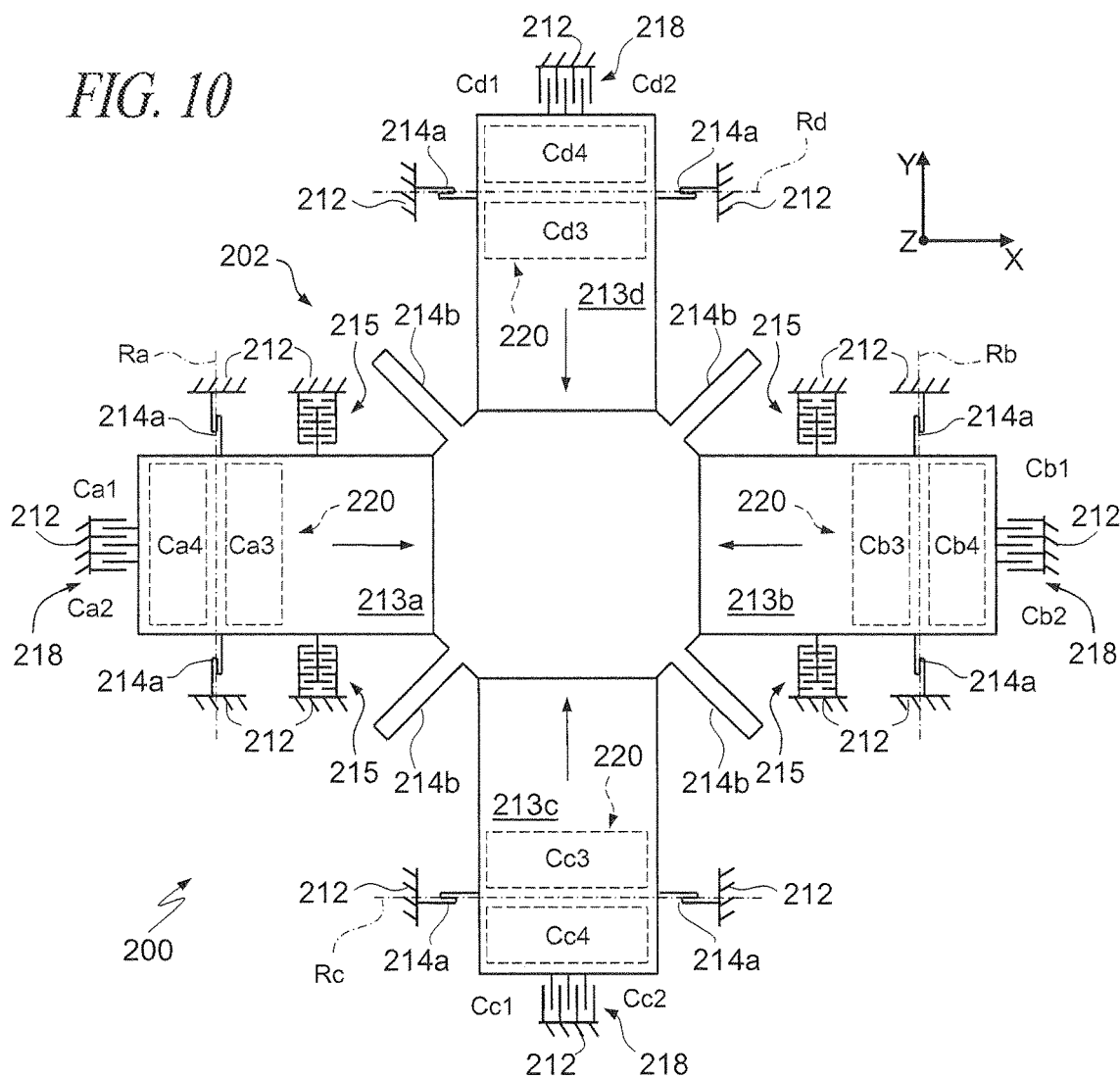
FIG. 10 is a simplified top plan view of a component of the device of FIG. 9.

The microstructure 202 is illustrated schematically in FIG. 10 and comprises:
a supporting structure 212;
a first sensing mass 213a and a second sensing mass 213b, constrained to the supporting structure 212 through respective systems of elastic suspension elements 214a, which enable translational movements along a first axis X, translational movements along a second axis Y perpendicular to the first axis X, and rotational movements about respective rotation axes Ra, Rb parallel to the second axis Y (as already described); and a third sensing mass 213c and a fourth sensing mass 213d, constrained to the supporting structure 212 through respective systems of elastic suspension elements 214a, which enable translational movements along the second axis Y (which functions as auxiliary driving axis), translational movements along the first axis X and rotational movements about respective rotation axes Rc, Rd parallel to the first axis X.

The sensing masses 213a, 213b, 213c, 213d are in practice arranged to form a cross and are moreover coupled to one another through elastic coupling elements 214b.

Driving units 215 of the driving device 3 are coupled in a symmetrical way to the first and second sensing masses 213a, 213b and are configured so as to cause displacements of the first and second sensing masses 213a, 213b along the axis X. The driving units 215 are of a comb-fingered type. The driving device 3 uses the driving units 215 for setting the first and second sensing masses 213a, 213b in oscillation along the axis X in phase opposition. The elastic coupling elements 214b are shaped so as to transmit the oscillatory movement to the third and fourth sensing masses 213c, 213d, which oscillate along the axis Y in phase opposition in response to the movement of the first and second sensing masses 213a, 213b. Examples of embodiment of the elastic coupling elements 214b that enable the mechanical coupling described are presented in the European patent application EP-A-2 339 293 dated Dec. 23, 2010, filed in the name of the present applicant.

The microstructure 202 comprises, for each sensing mass 213a, 213b, 213c, 213d, differential sensing units 218, 220 for sensing displacements of the sensing masses 213a, 213b, 213c, 213d themselves respectively in the plane XY (sensing units 218) and out of the plane XY (sensing units 220, in particular for rotations of the sensing masses 213a, 213b, 213c, 213d about the respective rotation axes Ra, Rb, Rc, Rd).

Figure 3:
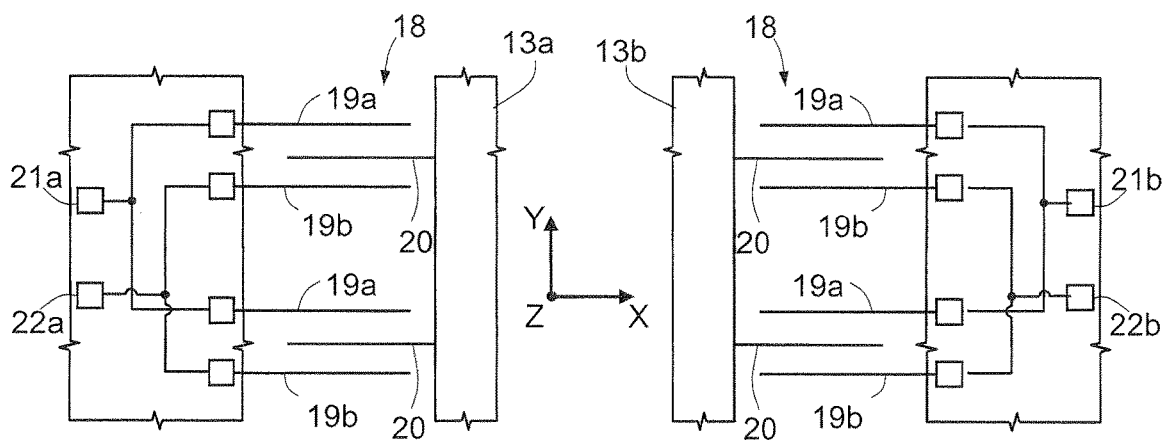
FIG. 3 is a schematic representation of an enlarged detail of the component of FIG. 2.

The sensing units 218 are of the parallel-plate capacitor type (as described with reference to FIGS. 2-4) and are oriented so as to sense displacements along the axis Y for the sensing masses 213a, 213b and displacements along the axis X for the sensing masses 213c, 213d. The sensing units 218 can hence be used for measuring accelerations of the microstructure 202 along the axes X and Y and rotations about the axis Z.

The sensing units 220, instead, comprise capacitively coupled facing electrodes, as described with reference to FIGS. 7, 8a, 8b. The electrodes of the sensing units 220 are arranged on the respective sensing masses 213a, 213b, 213c, 213d and on the supporting structure 212, in opposed pairs with respect to the respective rotation axes Ra, Rb, Rc, Rd. Consequently, the sensing units 220 sense rotations of the sensing masses out of the plane XY, about the respective rotation axes Ra, Rb, Rc, Rd and can be used for measuring accelerations of the microstructure 202 along the axis Z and rotations about the axes X and Y.

Figure 11:
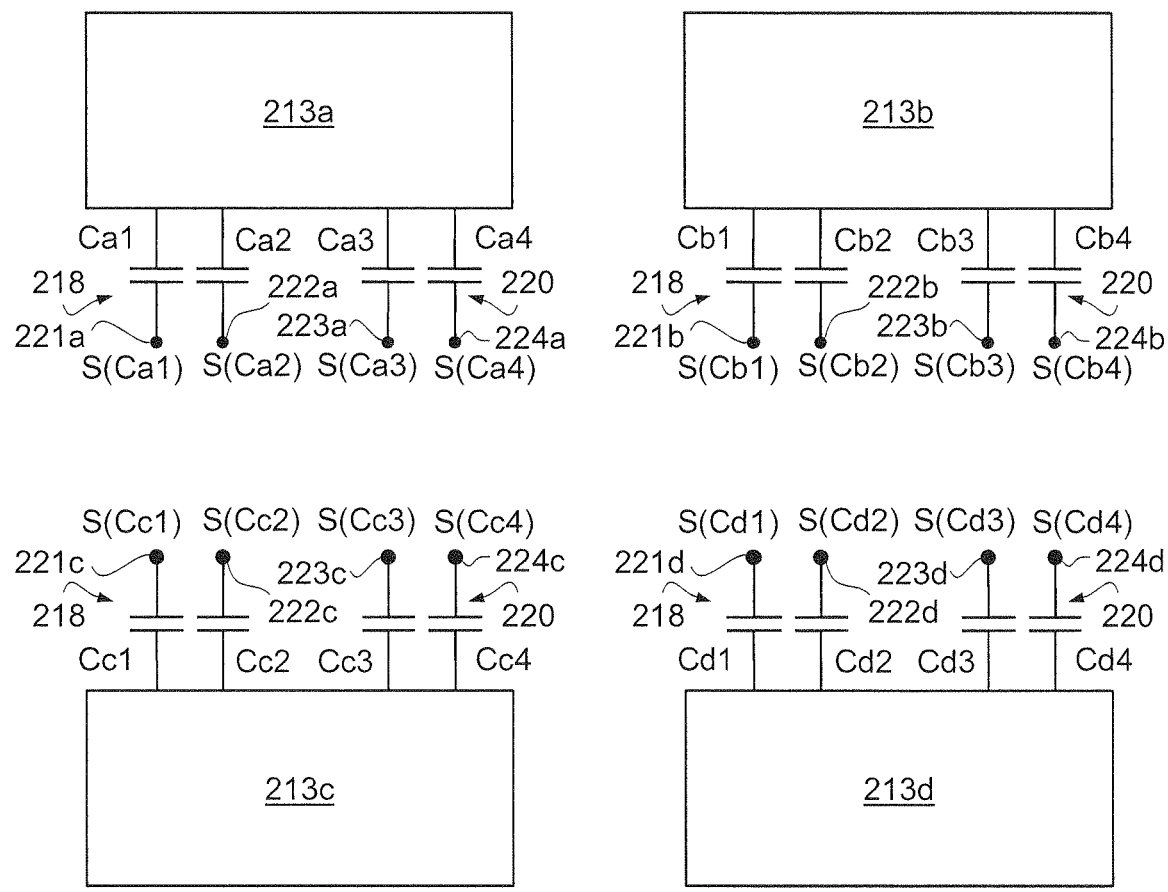
FIG. 11 is a schematic representation of an enlarged detail of the component of FIG. 10.

FIG. 11 is a schematic illustration of the capacitive coupling between the sensing masses 213a, 213b, 213c, 213d and respective sensing terminals.

For the first sensing mass 213a, the sensing unit 218 is coupled to sensing terminals 221a, 222a (where signal contributions S(Ca1), S(Ca2) are present) respectively through differential capacitances Ca1, Ca2, whereas the sensing unit 220 is coupled to sensing terminals 223a, 224a (where signal contributions S(Ca3), S(Ca4) are present) respectively through differential capacitances Ca3, Ca4.

For the second sensing mass 213b, the sensing unit 218 is coupled to sensing terminals 221b, 222b (where signal contributions S(Cb1), S(Cb2) are present) respectively through differential capacitances Cb1, Cb2, whereas the sensing unit 220 is coupled to sensing terminals 223b, 224b (where signal contributions S(Cb3), S(Cb4) are present) respectively through differential capacitances Cb3, Cb4.

The capacitances Ca1, Cb1, the capacitances Ca2, Cb2, the capacitances Ca3, Cb3, and the capacitances Ca4, Cb4 are corresponding capacitances in the sense defined above.

For the third sensing mass 213c, the sensing unit 218 is coupled to sensing terminals 221c, 222c (where signal contributions S(Cc1), S(Cc2) are present) respectively through differential capacitances Cc1, Cc2, whereas the sensing unit 220 is coupled to sensing terminals 223c, 224c (where signal contributions S(Cc3), S(Cc4) are present) respectively through differential capacitances Cc3, Cc4.

For the fourth sensing mass 213d, the sensing unit 218 is coupled to sensing terminals 221d, 222d (where signal contributions S(Cd1), S(Cd2) are present) respectively through differential capacitances Cd1, Cd2, whereas the sensing unit 220 is coupled to sensing terminals 223d, 224d (where signal contributions S(Cd3), S(Cd4) are present) respectively through differential capacitances Cd3, Cd4.

The capacitances Cc1, Cd1, the capacitances Ca2, Cb2, the capacitances Ca3, Cb3, and the capacitances Ca4, Cb4 are corresponding capacitances in the sense defined above.

The sensing terminals of the microstructure 202 are connected cyclically to the routing stage 7 through the multiplexer 204 for sensing accelerations and rotations with respect to the axes X, Y, Z. For each quantity, in particular, the sensing units 218 or the sensing units 220 of a pair of sensing masses 213a, 213b, 213c, 213d that oscillate in phase opposition along one and the same axis (X or Y) are used. For the accelerations and rotations with respect to the axis Z all the sensing units 220 and all the sensing units 218, respectively, may be used. Moreover, the routing stage determines the coupling of the sensing terminals of the microstructure 202 to the sensing interface 8 in the acceleration-reading mode (so that the signal contributions due to corresponding capacitances are summed) or in the rotation-reading mode (so that the signal contributions due to corresponding capacitances are subtracted), according to the value of the selection signal SEL2 supplied by the control unit 6. As already described previously, in this way it is possible to amplify the signal components due to the quantity that is to be measured, attenuating the effects due to the other quantities that interact with the sensing units involved. In addition, for sensing the acceleration along the axis Z and the rotation according to Z it is advantageous to add the contributions of the corresponding capacitances of all four sensing masses 213a, 213b, 213c, 213d, which yield concordant contributions, so as to obtain a greater amplification of the sensing signal.

In detail, the signal contributions are combined as follows.

Sensing of the acceleration along the axis X:

$$S_X = (S(Cc1) + S(Cd1)) - (SCc2 + SCd2))$$

Sensing of the acceleration along the axis Y:

$$S_Y = (S(Ca1) + S(Cb1)) - (SCa2 + SCb2))$$

Sensing of the acceleration along the axis Z:

$$S_Z = (S(Ca3) + S(Cb3) + S(Cc3) + S(Cd3)) + -(S(Ca4) + S(Cb4) + S(Cc4) + S(Cd4))$$

Sensing of the rotation about the axis Y (pitch):

$$S_{PITCH} = (S(Ca3) - S(Cb3)) - (S(Ca4) - S(Cb4))$$

Sensing of the rotation about the axis X (roll):

$$S_{ROLL} = (S(Cc3) - S(Cd3)) - (S(Cc4) - S(Cd4))$$

Sensing of the rotation about the axis X (yaw):

$$S_{YAW} = (S(Ca1) + S(Cb2)) - (S(Ca2) + S(Cb1))$$

or else:

$$S_{YAW} = (S(Cc1) + S(Cd2)) - (S(Cc2) + S(Cd1))$$

or else:

$$S_{YAW} = (S(Ca1) + S(Cb2)) - (S(Ca2) + S(Cb1)) + (S(Cc1) + S(Cd2)) + -(S(Cc2) + S(Cd1))$$

The device described is particularly flexible in so far as it enables sensing with a single microstructure of as many as six independent quantities. The quantities sensed may be made available simultaneously since reading can take place in time division, as described, for the various axes.

Figure 12:
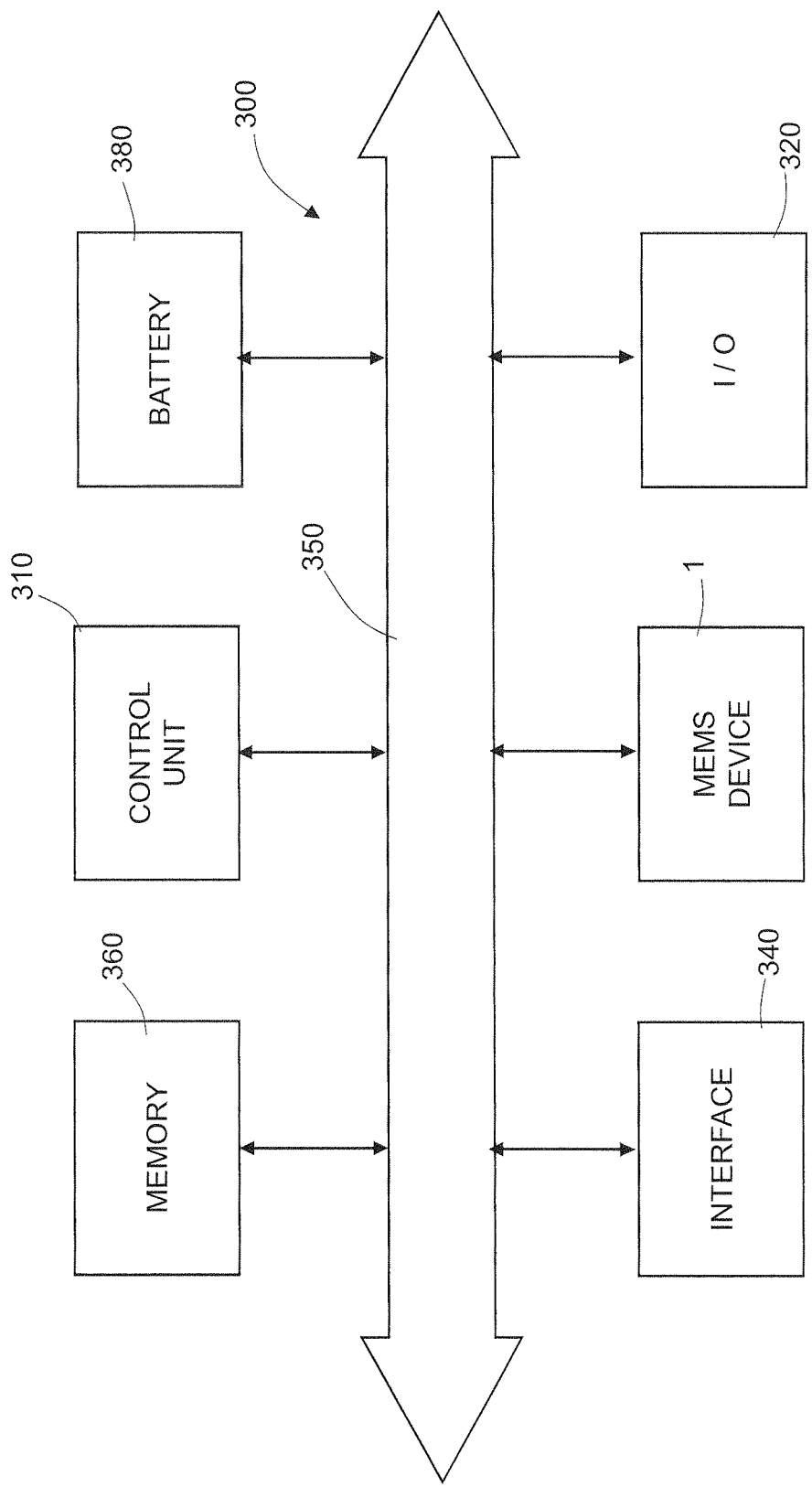
FIG. 12 is a simplified block diagram of an electronic system incorporating a microelectromechanical sensor according to one embodiment of the present disclosure.

FIG. 12 illustrates a portion of an electronic system 300 according to an embodiment of the present disclosure. The system 300 incorporates the microelectromechanical device 1 and can be used in electronic systems, such as, for example, a palmtop computer (personal digital assistant, PDA), a portable computer, possibly with wireless capacity, a cell phone, a messaging device, a digital audio player, a digital photographic camera or video camera, an inertial navigation system, an automotive system, or other devices designed to process, store, transmit or receive information. For example, the microelectromechanical device 1 can be used in a digital camera for sensing movements and carry out an image stabilization. In a further embodiment, the microelectromechanical device 1 is included in a user interface activated by motion for computers or consoles for videogames. In a further embodiment, the microelectromechanical device 1 is incorporated in a satellite navigation device and is used for temporary tracking of position in the case of loss of the satellite positioning signal.

The electronic system 300 can comprise a controller 310, an input/output (I/O) device 320 (for example, a keyboard or a display), the microelectromechanical device 1, a wireless interface 340, and a memory 360, of a volatile or nonvolatile type, which are coupled together through a bus 350. In one embodiment, a battery 380 can be used for supplying the system 300. It should be noted that the scope of the present disclosure is not limited to embodiments having necessarily one or all of the devices listed.

The controller 310 can comprise, for example, one or more microprocessors, microcontrollers, and the like.

The I/O device 320 can be used for generating a message. The system 300 can use the wireless interface 340 to transmit and receive messages to and from a wireless communication network with a radiofrequency (RF) signal. Examples of wireless interface can comprise an antenna, a wireless transceiver, such as a dipole antenna, even though the scope of the present disclosure is not limited from this standpoint. Moreover, the I/O device 320 can supply a voltage representing what is stored either in the form of digital output (if digital information has been stored) or in the form of analog output (if analog information has been stored).

Finally, it is clear that modifications and variations may be made to the device described and illustrated herein, without thereby departing from the sphere of protection of the present disclosure.

In particular, the possibility of integrating the functions of accelerometer and gyroscope is not limited to just the configurations of microstructure described, but can be advantageously exploited with any microstructure having pairs of movable masses in phase opposition.

In order to reduce any risk of errors due to spurious mechanical couplings, it is hence possible to use, instead of each individual sensing mass, systems of a number of masses with an auxiliary mass for driving and a movable mass with a degree of freedom with respect to the driving mass.

In addition, a number of reading chains can be clearly used, possibly connected in a permanent way to the microstructure, instead of a single chain connected in time division to the various terminals.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate;
a plurality of pairs of fixed electrodes on the substrate;
a first pair of masses aligned with each other along a first axis, each of the masses having a first end and a second end;
a second pair of masses aligned with each other along a second axis that is transverse to the first axis, each of the masses having a first end and a second end;
a plurality of elastic coupling elements, each elastic coupling element of the plurality of elastic coupling elements being coupled between the first end of a mass of the first pair of masses and the first end of a mass of the second pair of masses;
a plurality of pairs of elastic suspension elements coupled to the substrate, each of the masses of the first pair and the second pair of masses being coupled to only one of the pairs of elastic suspension elements at a location between the first end and the second end, the location being closer to the second end than the first end and aligned between a respective pair of fixed electrodes, each pair of elastic suspension elements configured to enable linear motion and rotation of the respective mass of the first pair and the second pair of masses around a third axis through the respective pair of elastic suspension elements; and
a plurality of pairs of movable electrodes aligned with the fixed electrodes, each pair of movable electrodes arranged on a side of a respective mass of each of the first and second pairs of masses facing the fixed electrodes, each pair of movable electrodes including a first movable electrode and a second movable electrode, wherein the first movable electrode and the second movable electrode of each pair of the plurality of pairs of movable electrodes are positioned on opposing sides of the third axis of each respective pair of elastic suspension elements with the first and second movable electrodes closer to the second end than the first end of each respective mass.

2. The device of claim 1 further comprising:
a plurality of sensing units, each sensing unit associated with a respective mass of the first and second pairs of masses, each sensing unit including a first pair of electrodes on the substrate.

3. The device of claim 2 wherein each sensing unit further includes a second pair of electrodes on the second end of each mass facing a respective first pair of electrodes.

4. The device of claim 3 wherein the second pair of movable electrodes is interposed between the first pair of electrodes of each sensing unit of the plurality of sensing units.

5. The device of claim 1 wherein the first axis and the second axis intersect in a central area.

6. The device of claim 5 wherein each of the first ends of the first pair of masses and the first ends of the second pair of masses are closer to the central area than each of the second ends of the first pair of masses and the second ends of the second pair of masses, respectively.

7. The device of claim 1 wherein the first pair of masses are configured to be driven and the second pair of masses are configured to move in response to the first pair of masses through the plurality of elastic coupling elements.

8. A device, comprising:
a substrate;
a plurality of pairs of fixed electrodes formed on the substrate;
a first mass, a second mass, a third mass, and a fourth mass, each mass having a first end and a second end, each of the first ends being closer to a central area than each of the second ends, the first, second, third, and fourth mass being arranged in a cross configuration;
a plurality of elastic coupling elements, each elastic coupling element being positioned and coupled between the first ends of adjacent masses;
a plurality of pairs of elastic suspension elements coupled to the substrate and to opposite sides of each mass and positioned at a location closer to the second end than to the first end of each mass, the location spaced apart from the first end and the second end of the respective mass, the respective mass being configured to rotate about a rotation axis through the respective pair of elastic suspension elements, the rotation axis of each respective mass proximate the second end of each respective mass with the first end of each mass positioned proximate one another; and
a plurality of pairs of movable electrodes formed on each of the masses, the movable electrodes aligned with the fixed electrodes, each pair of movable electrodes arranged on a side of a respective mass of each of the first, second, third, and fourth masses facing the fixed electrodes, each pair of movable electrodes including a first movable electrode and a second movable electrode, wherein the first movable electrode and the second movable electrode of each pair of the plurality of pairs of movable electrodes are positioned on opposing sides of the rotation axis of each respective pair of elastic suspension elements with the first and second movable electrodes closer to the second end than the first end of each respective mass.

9. The device of claim 8 wherein each mass includes a sensing unit coupled to the second end of a respective mass and the substrate.

10. The device of claim 9 wherein each sensing unit includes parallel-plate capacitor electrodes.

11. The device of claim 8 wherein the plurality of pairs of fixed electrodes are capacitively coupled to corresponding ones of the plurality of pairs of mobile electrodes.

12. The device of claim 11 wherein the plurality of pairs of fixed electrodes and the plurality of pairs of mobile electrodes are comb-fingered electrodes.

13. The device of claim 8 wherein the plurality of pairs of fixed electrodes are configured to generate sensing signals, the device further comprising:
    processing circuitry configured to drive at least one of the first mass, the second mass, the third mass, and the fourth mass, the processing circuitry configured to receive the sensing signals and combine the sensing signals in a first sensing mode and a second sensing mode.

14. A system, comprising:
    a first pair of masses aligned with each other along a first axis, each of the masses having a first end and a second end, the first pair of masses being configured to be driven;
    a second pair of masses aligned with each other along a second axis that is transverse to the first axis, each of the masses having a first end and a second end;
    a plurality of elastic coupling elements, each elastic coupling element of the plurality of elastic coupling elements being coupled between the first end of a mass of the first pair of masses and the first end of the second pair of masses, the second pair of masses being configured to move in response to the first pair of masses through the plurality of elastic coupling elements;
    a plurality of pairs of fixed electrodes, each pair of fixed electrodes of the plurality of pairs of fixed electrodes being aligned with a half of each respective mass proximate the second end of each respective mass of the first pair and the second pair of masses, each pair of fixed electrodes of the plurality of pairs of fixed electrodes configured to sense acceleration and rotation of the respective mass;
    a plurality of pairs of elastic suspension elements, each of the masses of the first pair and the second pair of masses being coupled to one of the pairs of elastic suspension elements at a location between the first end and the second end, the location being closer to the second end than the first end and aligned between a respective pair of fixed electrodes, each pair of elastic suspension elements configured to enable translational motion along the first axis or the second axis and rotational motion about a third axis through the one of the pairs of elastic suspension elements of the respective mass of the first pair and the second pair of masses, the third axis proximate the second end of each respective mass with the first ends of each mass positioned proximate one another;
    a plurality of pairs of movable electrodes on the half of each of the masses on a side of each of the masses facing the plurality of pairs of fixed electrodes, the movable electrodes aligned with the fixed electrodes, the plurality of pairs of fixed electrodes being configured to generate sensing signals, each pair of movable electrodes including a first movable electrode and a second movable electrode arranged on opposing sides of the third axis of the one of the pairs of elastic suspension elements of each respective mass with the first and second movable electrodes closer to the second end than the first end of each respective mass; and
    processing circuitry configured to drive the first pair of masses.

15. The system of claim 14 wherein the processing circuitry is configured to receive the sensing signals and combine the sensing signals in a first sensing mode and a second sensing mode.

16. The device of claim 14 further comprising:
    a substrate;
    a plurality of sensing units, each sensing unit coupled to the second end of a respective mass of the first and second pairs of masses and the substrate.

17. The device of claim 16 wherein the plurality of sensing units includes:
    a first plurality of sensing units coupled to the second end of a respective one of the first pair of masses and the substrate and configured to detect displacement of the first pair of masses along the first axis; and
    a second plurality of sensing units coupled to the second end of a respective one of the second pair of masses and the substrate and configured to detect displacements along the second axis.

18. The device of claim 14 further comprising:
    a plurality of driving units coupled to each of the first pair of masses, the plurality of driving units structured to displace the first pair of masses along the first axis.

19. The device of claim 18 wherein the plurality of driving units are comb-fingered driving units.

20. The device of claim 14 wherein the second pair of masses are configured to move in phase opposition to the first pair of masses through the plurality of elastic coupling elements.

* * * * *